US012645548B1

(12) United States Patent
Koradhanyamath et al.

(10) Patent No.: US 12,645,548 B1
(45) Date of Patent: Jun. 2, 2026

(54) SYSTEM BOARD BACKUP AND RESTORE SYSTEM

(71) Applicant: Dell Products L.P., Round Rock, TX (US)

(72) Inventors: Sangamesh Koradhanyamath, Bengaluru (IN); Nagaraj Annenavar, Bengaluru (IN); Swapan Kumar Bhakat, Jaduguda (IN); Adithya Mundigemane Shankaranarayana, Chickmagalur (IN)

(73) Assignee: Dell Products L.P., Round Rock, TX (US)

( * ) Notice: Subject to any disclaimer, the term of this patent is extended or adjusted under 35 U.S.C. 154(b) by 26 days.

(21) Appl. No.: 18/948,787

(22) Filed: Nov. 15, 2024

(51) Int. Cl.
| | |
|---|---|
| *G06F 11/00* | (2006.01) |
| *G06F 11/1446* | (2026.01) |
| *G06F 11/16* | (2006.01) |

(52) U.S. Cl.
CPC ...... *G06F 11/1469* (2013.01); *G06F 11/1658* (2013.01); *G06F 2201/805* (2013.01)

(58) Field of Classification Search
CPC ............. G06F 11/1458; G06F 11/1469; G06F 11/1658; G06F 8/61
See application file for complete search history.

(56) References Cited

U.S. PATENT DOCUMENTS

| | | | |
|---|---|---|---|
| 10,564,872 B2 | 2/2020 | Benisty | |
| 2008/0256526 A1* | 10/2008 | Ellsworth | G06F 11/1433 717/168 |
| 2013/0205063 A1* | 8/2013 | Zhang | G06F 11/1451 711/E12.008 |
| 2015/0347153 A1* | 12/2015 | Chou | G06F 3/0683 713/1 |
| 2021/0191657 A1* | 6/2021 | Moss | G06F 3/0656 |

OTHER PUBLICATIONS

Wang, Qian et al., Datacenter Secure Control Module Specification (DC-SCM), Open Computer Project, Jul. 27, 2022 (Year: 2022).*

* cited by examiner

*Primary Examiner* — Marc Duncan
(74) *Attorney, Agent, or Firm* — Joseph Mencher

(57) ABSTRACT
A system board backup and restore system includes a computing device, a storage device that is housed in the computing device and that includes a CMB device, and a replacement system board that is housed in the computing device, that is coupled to the storage device, and that includes a replacement system board BMC device. During initialization of the computing device, the replacement system board BMC device identifies the CMB device. Subsequent to identifying the CMB device, the replacement system board BMC device retrieves first firmware from the CMB device that was backed up in the CMB device by a replaced system board BMC device included on a replaced system board that was previously housed in the computing device and coupled to the storage device. The replacement system board BMC device then installs the first firmware on replacement system board subsystem(s) included on the replacement system board.

20 Claims, 20 Drawing Sheets

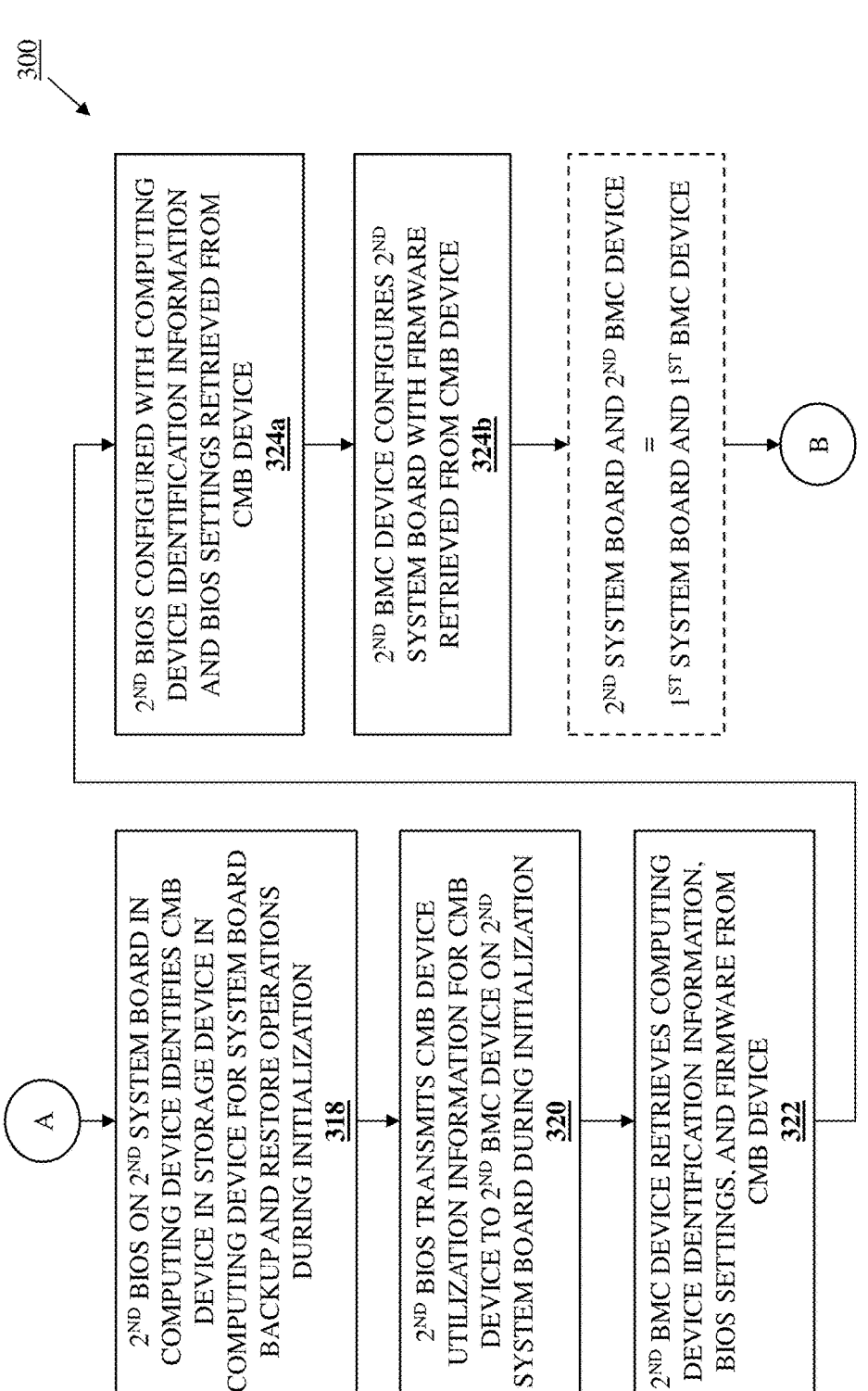

300

A

2ND BIOS ON 2ND SYSTEM BOARD IN COMPUTING DEVICE IDENTIFIES CMB DEVICE IN STORAGE DEVICE IN COMPUTING DEVICE FOR SYSTEM BOARD BACKUP AND RESTORE OPERATIONS DURING INITIALIZATION
318

2ND BIOS TRANSMITS CMB DEVICE UTILIZATION INFORMATION FOR CMB DEVICE TO 2ND BMC DEVICE ON 2ND SYSTEM BOARD DURING INITIALIZATION
320

2ND BMC DEVICE RETRIEVES COMPUTING DEVICE IDENTIFICATION INFORMATION, BIOS SETTINGS, AND FIRMWARE FROM CMB DEVICE
322

2ND BIOS CONFIGURED WITH COMPUTING DEVICE IDENTIFICATION INFORMATION AND BIOS SETTINGS RETRIEVED FROM CMB DEVICE
324a

2ND BMC DEVICE CONFIGURES 2ND SYSTEM BOARD WITH FIRMWARE RETRIEVED FROM CMB DEVICE
324b

2ND SYSTEM BOARD AND 2ND BMC DEVICE
=
1ST SYSTEM BOARD AND 1ST BMC DEVICE

SYSTEM BOARD BACKUP AND RESTORE SYSTEM

BACKGROUND

The present disclosure relates generally to information handling systems, and more particularly to backing up and restoring system boards in information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other computing devices known in the art, include system boards such as motherboards, system boards provided by DataCenter-ready Secure Control Modules (DC-SCMs) defined by the Open Compute Project, and/or other system boards known in the art. As will be appreciated by one of skill in the art, settings (e.g., Basic Input/Output System (BIOS) settings and/or other system board settings known in the art), firmware, and/or other configuration information is often used to configure such system boards to operate in a desired manner. However, conventional backup and restoring of such configuration information utilizes a Serial Peripheral Interface (SPI)-based flash storage device that must be provided in the server device separately from the system board and at an added cost. Furthermore, such SPI-based flash storage devices are limited in storage capacity (e.g., SPI-based flash storage devices typically include a storage capacity of approximately 4 MB) and, as such, conventional backup/restore operations for a system boards provide only for the partial and limited backup and restoring of the BIOS settings for the BIOS on the system board being replaced, and are not scalable for use in the backup and restoring of the firmware for the system board.

As will be appreciated by one of skill in the art in possession of the present disclosure, such limited/partial backup/restore operations may result in the replacement system board being configured with firmware that is different than the firmware that was used with the system board being replaced (e.g., older versions of that firmware, newer versions of that firmware, etc.), and it is undesirable to configure replacement system boards with firmware that is different than the firmware that was used with the system board being replaced absent that different firmware providing new features and/or being used to address security issues, as such different firmware will change as current "Best Known Configuration (BKC)" of the system board being replaced and may cause issues with the subsequent operation of the replacement system board and/or the server device.

Accordingly, it would be desirable to provide a system board backup and restore system that addresses the issues discussed above.

SUMMARY

According to one embodiment, an Information Handling System (IHS) includes a replacement system board; a replacement system board Baseboard Management Controller (BMC) processing system that is included on the replacement system board; and a replacement system board BMC memory system that is included on the replacement system board, that is coupled to the replacement system board BMC processing system, and that includes instructions that, when executed by the replacement system board BMC processing system, cause the replacement system board BMC processing system to provide a replacement system board BMC engine that is configured to: identify, during initialization of the IHS, a first CMB device in a first storage device that is coupled to the BMC processing system; retrieve, from the first CMB device subsequent to identifying the first CMB device, first firmware that was backed up in the first CMB device by a replaced system board BMC device included on a replaced system board that was previously included in the IHS and coupled to the storage device; and install the first firmware on at least one replacement system board subsystem that is included on the replacement system board.

BRIEF DESCRIPTION OF THE DRAWINGS

FIG. 3B is a flow chart illustrating an embodiment of a second portion of the method for backing up and restoring a system board.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
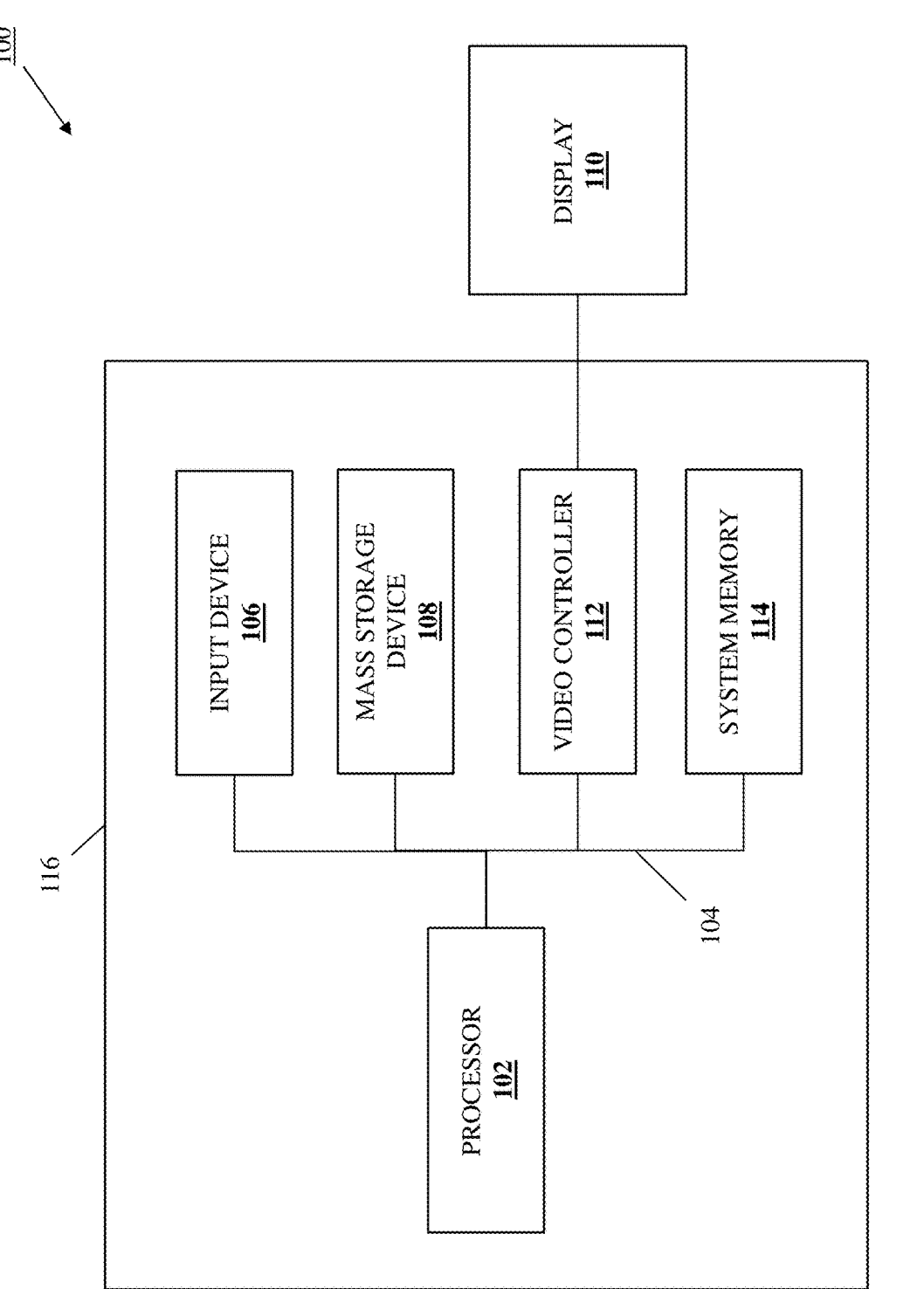
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
FIG. 2 is a schematic view illustrating an embodiment of a computing device that may include the system board backup and restore system of the present disclosure.

Referring now to FIG. 2, an embodiment of a computing device 200 is illustrated that may include the system board backup and restore system of the present disclosure. In an embodiment, the computing device 200 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the computing device 200 discussed below may be provided by other computing devices that are configured to operate similarly as the computing device 200 discussed below.

In the illustrated embodiment, the computing device 200 includes a chassis 202 that houses the components of the computing device 200, only some of which are illustrated and described below. In the embodiment illustrated in FIG. 2, the chassis 200 houses a system board 204 that may be provided by a motherboard, a system board provided by DC-SCMs defined by the Open Compute Project, and/or other system boards that would be apparent to one of skill in the art in possession of the present disclosure. In the examples discussed below, the system board 204 is described as being providing a "replaced" system board that has its configuration information backed up, and is subsequently replaced with a "replacement" system board that is "restored" using that backed up configuration information, but one of skill in the art in possession of the present disclosure will appreciate how the system board 204 may be utilized in the system board backup and restore system of the present disclosure in a variety of manners that will fall within the scope of the present disclosure.

As illustrated, the system board 204 may include a Basic Input/Output System (BIOS) 206 that one of skill in the art in possession of the present disclosure will appreciate may be configured to perform hardware initialization during boot operations (e.g., Power-On STartup (POST)) and/or other initialization operations for the computing device 200, run-time services for operating systems and applications provided on the computing device 200, and/or other conventional BIOS operations known in the art.

The BIOS 206 may include a BIOS processing system (not illustrated, but which may include the processor 102 discussed above with reference to FIG. 1 such as, for example, a Central Processing Unit (CPU)) and a BIOS memory system (not illustrated, but which may include the memory 114 discussed above with reference to FIG. 1 such as, for example, Dynamic Random Access Memory (DRAM)) that is coupled to the BIOS processing system and that includes instructions that, when executed by the BIOS processing system, cause the BIOS processing system to provide a BIOS engine 206a that is configured to perform the functionality of the BIOS engines, BIOS, and/or computing devices discussed below. Furthermore, the BIOS 206 may also include BIOS subsystems 206b that may be configured to store the computing device identification information, BIOS settings, and other configuration information described below, that may be configured with the firmware and/or other configuration information as described below, and/or that otherwise may be utilized in the system board backup and restore system of the present disclosure as described below.

The system board 204 may also include a Baseboard Management Controller (BMC) device 208 that one of skill in the art in possession of the present disclosure will recognize may provide an out-of-band management platform for the computing device 200 (using mostly separate resources from the computing device 200) via a browser-based interface or Command Line Interface (CLI) that enables management and monitoring of hardware in the computing device 200. In a specific example, the BMC device 208 may be provided by an integrated DELL® Remote Access Controller (iDRAC) available in computing devices available from DELL® Inc. of Round Rock, Texas, United States, or according to the OpenBMC project run by the LINUX® foundation, although other BMC devices will fall within the scope of the present disclosure as well.

The BMC device 208 may include a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 204 that is configured to perform the functionality of the BMC engines, BMC devices, and/or computing devices discussed below.

Furthermore, the BMC device 208 may also include BMC subsystems 208b that may be configured to store the BMC inventory information described below, that may be configured with the firmware and/or other configuration information as described below, and/or that otherwise may be utilized in the system board backup and restore system of the present disclosure as described below. As illustrated, the BMC device 208 may be coupled to the BIOS 206 via a communication subsystem that is described below as being provided by an Intelligent Platform Management Interface (IPMI) communication subsystem in the specific examples provided below, but that may be provided by other communication subsystems (e.g., a PCIe BMC Interface (PBI) communication subsystem) while remaining within the scope of the present disclosure as well.

The system board 204 may also include a plurality of system board subsystems 210 that are coupled to the BMC device 208 and that may include a Complex Programmable Logic Device (CPLD) subsystem, a personality module, a networking subsystem (e.g., a Network Interface Controller (NIC) card or other networking card), a storage subsystem (e.g., a storage card), a graphics subsystem (e.g., a Graphic Processing Unit (GPU) card), and/or any other system board subsystem that would be apparent to one of skill in the art in possession of the present disclosure. As described below, any or all of the BIOS subsystems 206b, the BMC subsystems 208b, and the system board subsystems 210 may have firmware installed thereon according to the teachings of the present disclosure, but while specific subsystems are illustrated and described herein, one of skill in the art will appreciate how other subsystems may be provided on the system board 204 and may have firmware installed thereon while remaining within the scope of the present disclosure as well.

The chassis 202 may also house a storage system including at least one storage device that, in the illustrated example, is provided by a plurality of Non-Volatile Memory express (NVMe) devices 212, 214, and up to 216 that are each coupled to the BIOS 206 and the BMC device 208, but that one of skill in the art in possession of the present disclosure will appreciate may be provided by other types of storage devices while remaining within the scope of the present disclosure as well. For example, the BIOS 206 may be coupled to each of the NVMe devices 212-216 via a PCIe bus or other PCIe connections, and the BMC device 208 may be coupled to each of the NVMe devices 212-216 by an NVMe Management Interface (NVMe-MI) out-of-band connection, although other connections will fall within the scope of the present disclosure as well.

As illustrated, each of the NVMe devices 212, 214, and up to 216 may include a respective Persistent Memory Region (PMR) that is provided by a respective Controller Memory Buffer (CMB) device 212a, 214a, and up to 216a in the examples illustrated and described below. However, while a specific computing device 200 has been illustrated and described, one of skill in the art in possession of the present disclosure will recognize that computing devices (or other devices operating according to the teachings of the present disclosure in a manner similar to that described below for the computing device 200) that provide the system board backup and restore system of the present disclosure may include a variety of components and/or component configurations for providing conventional computing device functionality, as well as the system board backup and restore functionality discussed below, while remaining within the scope of the present disclosure as well.

Figure 3A:
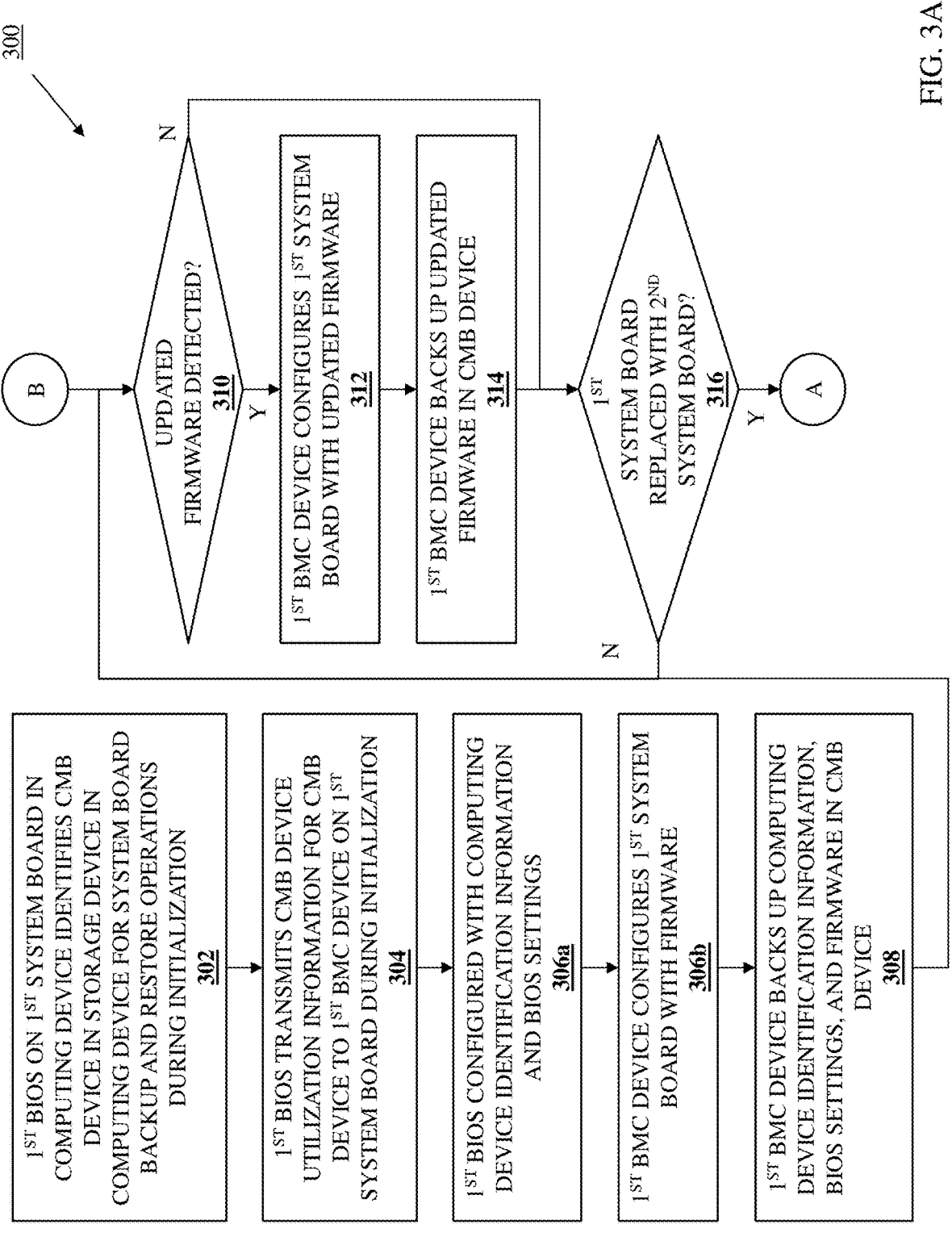
FIG. 3A is a flow chart illustrating an embodiment of a first portion of a method for backing up and restoring a system board.

Referring now to FIG. 3, an embodiment of a method 300 for backing up and restoring a system board is illustrated. As discussed below, the systems and methods of the present disclosure provide for the backing up of system board firmware and other system board configuration information for a first system board in a CMB device of a storage device coupled to the first system board, and the restoring of a second system board (which replaces the first system board) to the configuration of the first system board using that system board firmware and other system board configuration information backed up in the CMB device. For example, the system board backup and restore system of the present disclosure may include a computing device, a storage device that is housed in the computing device and that includes a CMB device, and a replacement system board that is housed in the computing device, that is coupled to the storage device, and that includes a replacement system board BMC device. During initialization of the computing device, the replacement system board BMC device identifies the CMB device. Subsequent to identifying the CMB device, the replacement system board BMC device retrieves first firmware from the CMB device that was backed up in the CMB device by a replaced system board BMC device included on a replaced system board that was previously housed in the computing device and coupled to the storage device. The replacement system board BMC device then installs the first firmware on replacement system board subsystem(s) included on the replacement system board. As such, a replacement system board for a computing device may be restored to a best-known configuration of a replaced system board that was used in the computing device immediately prior to the replacement system board.

Figure 4:
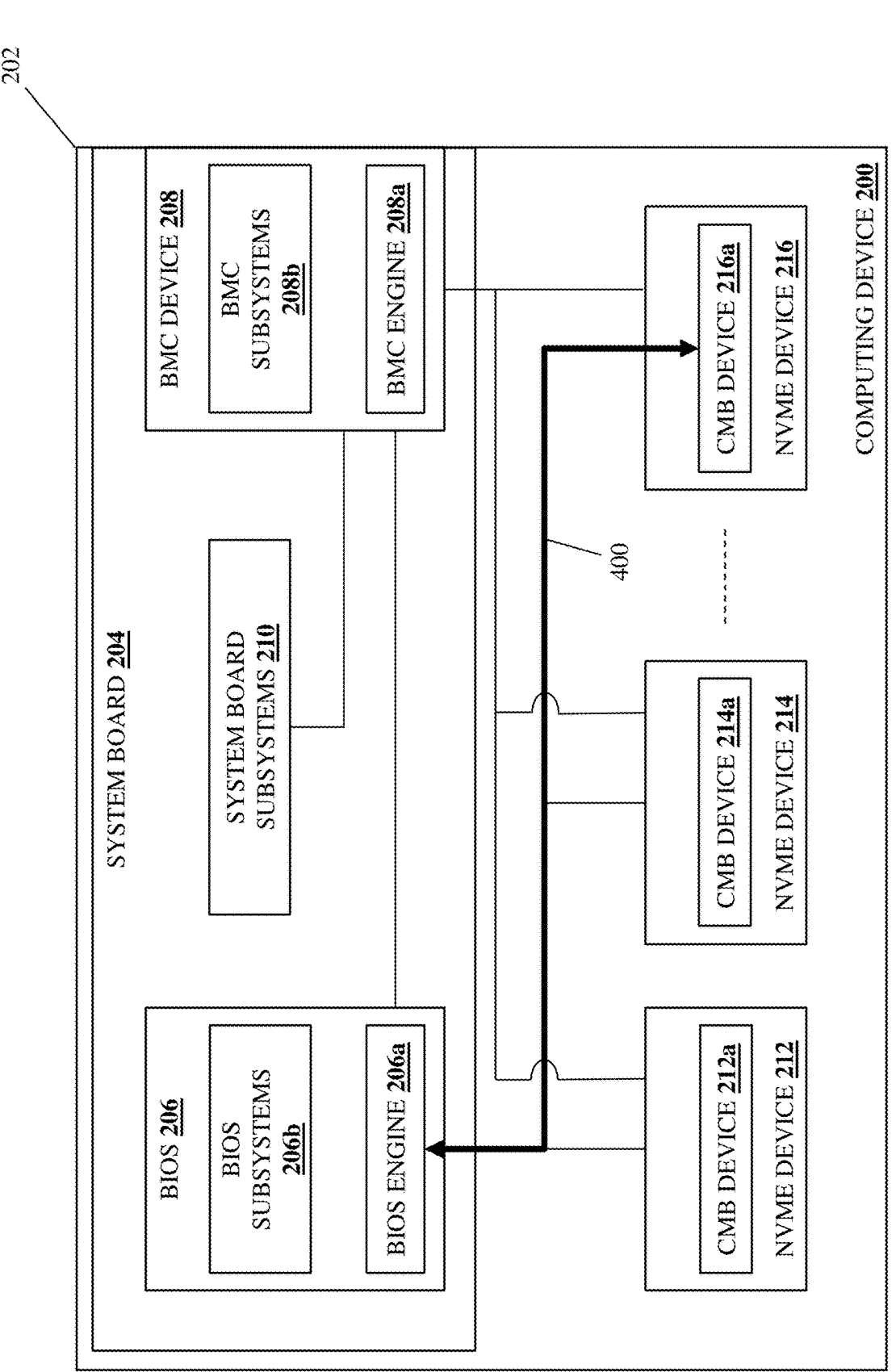
FIG. 4 is a schematic view illustrating an embodiment of the computing device of FIG. 2 operating during the method of FIG. 3.

The method 300 begins at block 302 where a first BIOS on a first system board in a computing device identifies a CMB device in a storage device in the computing device for system board backup and restore operations during initialization. With reference to FIG. 4, in an embodiment of block 302, the computing device 200 may be powered on, booted, reset, rebooted, and/or otherwise be initialized such that the BIOS 206 begins hardware initialization (e.g., POST operations) and/or other initialization operations known in the art. In a specific example, during the initialization of the computing device 200 and as part of the initialization operations, the BIOS engine 206a in the BIOS 206 may perform CMB device identification operations 400 that include identifying the CMB device 216a in the NVMe device 216 for use in performing the system board backup and restore operations described below. As will be appreciated by one of skill in the art in possession of the present disclosure, while the identification of the CMB device 216a in the NVMe device 216 for use in performing system board backup and restore operations is described herein, any of the CMB devices in any of the NVMe devices in the computing device 200 (e.g., the CMB device 212a in the NVMe device 212 and/or the CMB device 214a in the NVMe device 214) may be identified similarly as described herein for the CMB device 216a in the CMB device 216. Furthermore, while only a single CMB device is illustrated and described in detail as being identified during the method 300, as described below multiple CMB devices may be identified for use in providing additional storage capacity, redundancy, failover, and/or other benefits for the system board backup and restore operations as well.

In an embodiment, the CMB device identification operations 400 may include the BIOS engine 206a setting a register for the CMB device 216a to indicate an intent to use the CMB device 216a for system board backup and restore operations (e.g., setting a "CMBMSC.CRE" register for the CMB device 216a to "1"). In some embodiments, as part of the CMB device identification operations 400, the BIOS engine 206a may identify a location of the CMB device 216a (e.g., a CMB "offset" in a "CMBLOC" register in the controller of the NVMe device 216), a size of the CMB device 216a (e.g., a CMB storage capacity in a "CMBSZ" register in the controller of the NVMe device 216), and/or any other CMB properties that would be apparent to one of skill in the art in possession of the present disclosure. However, while a few specific examples of CMB device identification operations have been described, one of skill in the art in possession of the present disclosure will appreciate how the CMB device in a storage device may be identified for use in the system board backup and restore operations described herein using a variety of techniques that will fall within the scope of the present disclosure as well.

Figure 5:
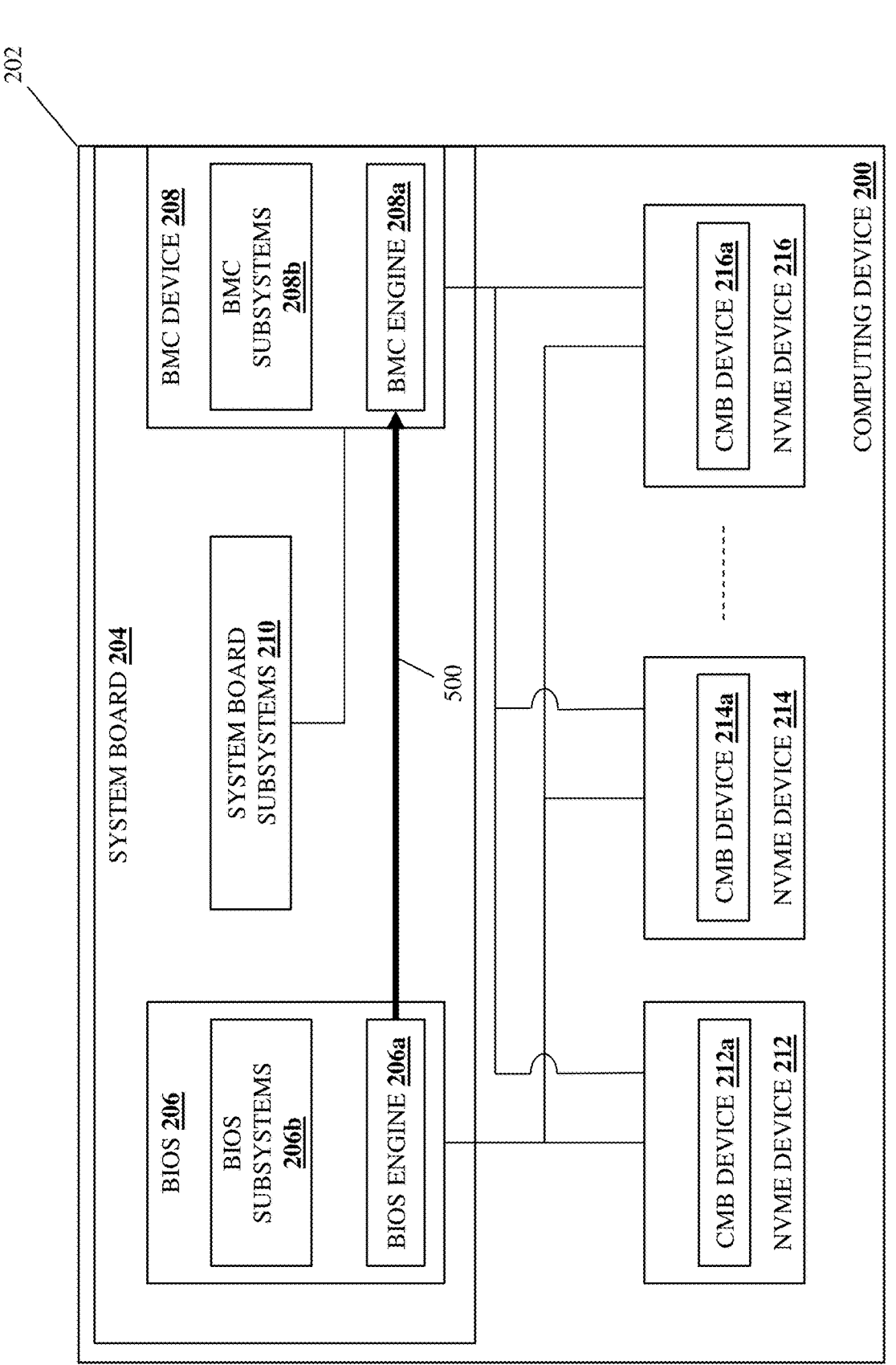
FIG. 5 is a schematic view illustrating an embodiment of the computing device of FIG. 2 operating during the method of FIG. 3.

The method 300 then proceeds to block 304 where the first BIOS transmits CMB device utilization information for the CMB device to a first BMC device on the first system board during initialization. With reference to FIG. 5, in an embodiment of block 304, the BIOS engine 206a in the BIOS 206 may perform CMB utilization information transmission operations 500 that may include transmitting any of the CMB properties identified at block 302 to the BMC engine 208a in the BMC device 208 during the initialization of the computing device 200 and as part of the initialization operations.

In a specific example, the CMB utilization information transmission operations 500 may include the BIOS engine 206a transmitting the location of the CMB device 216a (e.g., the CMB "offset" of the CMB device 216a), the CMB storage capacity, and/or other CMB properties retrieved by the BIOS engine 206a as described above to the BMC engine 208a via the IPMI communication subsystem discussed above, although the transmission of other CMB utilization information and/or the use of other communication subsystems to transmit CMB utilization information will fall within the scope of the present disclosure as well.

The method 300 then proceeds to block 306a where the first BIOS is configured with computing device identification information and BIOS settings. As will be appreciated by one of skill in the art in possession of the present disclosure, the first iteration of the method 300 described herein provides an example in which the system board 204 has been provided in the computing device 200 as part of the manufacture of the computing device 200, and the computing device 200 has been provided to a user and is initialized for the first time in order to initially configure the system board 204 for use with the computing device 200. However, one of skill in the art in possession of the present disclosure will appreciate how the initial configuration of the system board 204 as part of the first initialization of the computing device 200 is just an example, and the configuration of the system board 204 at may be performed in a variety of manners that will fall within the scope of the present disclosure as well.

Figure 6A:
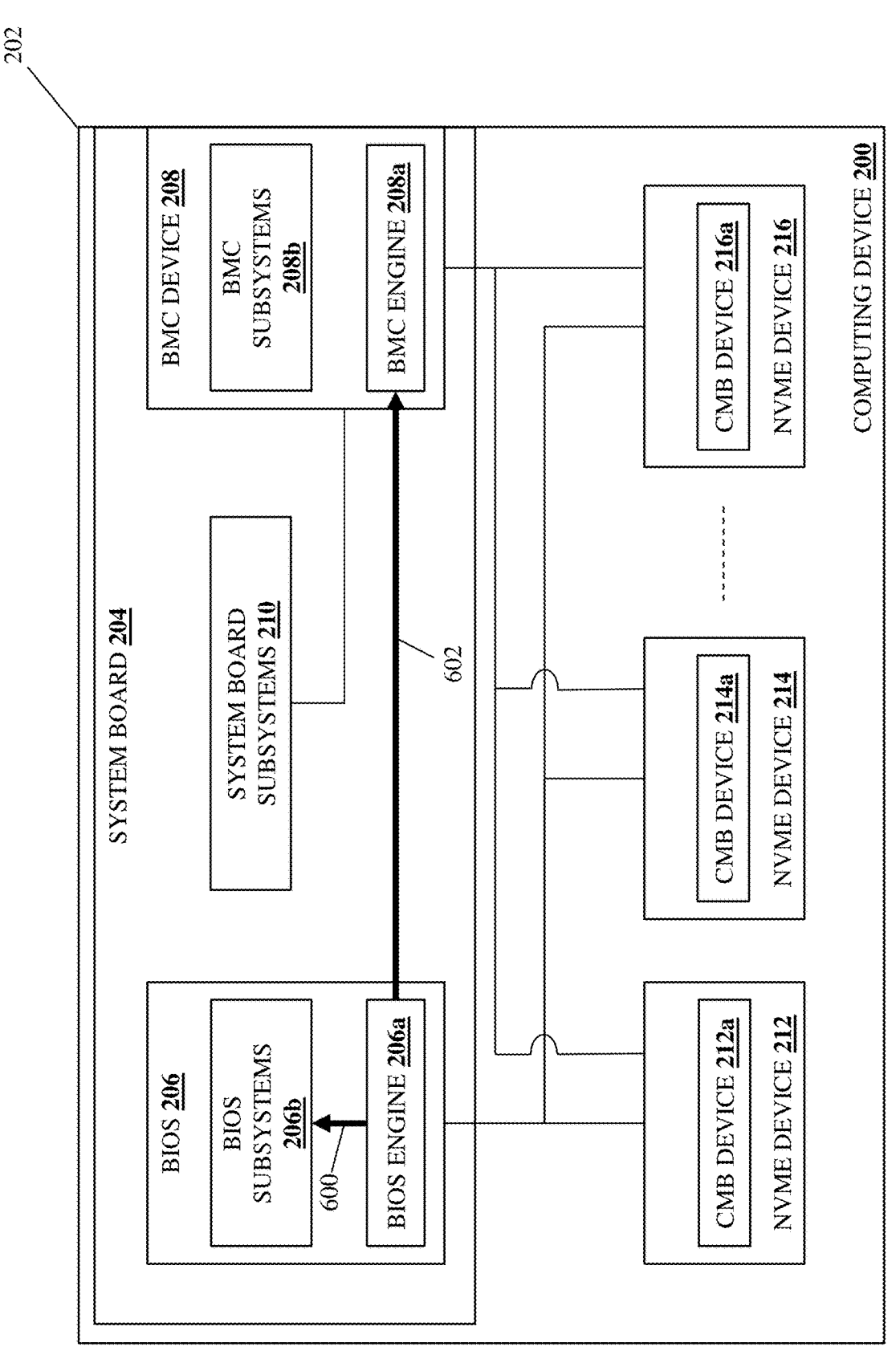
FIG. 6A is a schematic view illustrating an embodiment of the computing device of FIG. 2 operating during the method of FIG. 3.

With reference to FIG. 6A, in this embodiment of block 306a, the BIOS engine 206a in the BIOS 206 may be provided with computing device identification information for the computing device 200 (e.g., a "service tag" or other unique identifier for the computing device 200 that may be provided to the BIOS engine 206a during manufacture at a manufacturing facility, from a user, and/or using a variety of other techniques known in the art), and may perform BIOS configuration operations 600 that include storing the computing device identification information in a memory subsystem included in the BIOS subsystems 206b, as well as computing device identification information BMC provisioning operations 602 that include providing the computing device identification information to the BMC engine 208a in the BMC device 208.

Figure 6B:
FIG. 6B is a schematic view illustrating an embodiment of the computing device of FIG. 2 operating during the method of FIG. 3.

Furthermore, at block 306a, the BMC engine 208a may retrieve or receive (e.g., via a network that is accessible to the BMC engine 208a, not illustrated) BIOS settings for the BIOS 206. With reference to FIG. 6B, the BMC engine 208a may then perform BIOS configuration operations 604 that include configuring the BIOS 206 with the BIOS settings. For example, the BIOS configuration operations 604 may include the BMC engine 208a configuring one or more of the BIOS subsystems 206b using the BIOS settings by executing a configuration job to provide system performance information in the BIOS settings, boot information in the BIOS settings, power information in the BIOS settings, memory information in the BIOS settings, as well as performing any other BIOS setting configuration operations that would be apparent to one of skill in the art in possession of the present disclosure.

Figure 7A:
FIG. 7A is a schematic view illustrating an embodiment of the computing device of FIG. 2 operating during the method of FIG. 3.
Figure 7B:
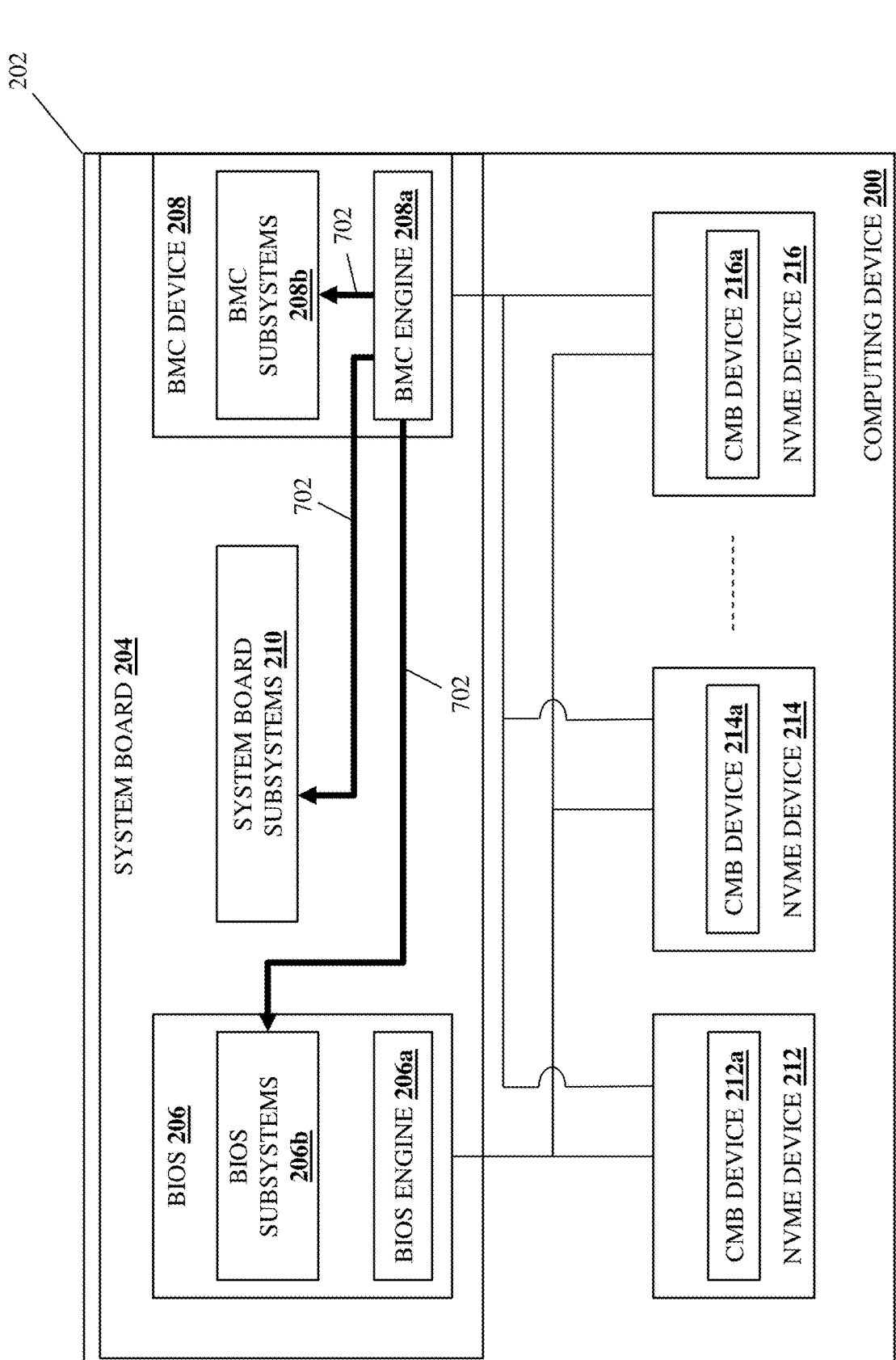
FIG. 7B is a schematic view illustrating an embodiment of the computing device of FIG. 2 operating during the method of FIG. 3.

The method 300 then proceeds to block 306b where the first BMC device configures the first system board with firmware. With reference to FIG. 7A, in an embodiment of block 306b and in response to storing the computing device identification information and configuring one or more of the BIOS subsystems 206b with the BIOS settings, the BIOS engine 206a may perform firmware installation instruction provisioning operations 700 that include transmitting an instruction to the BMC engine 208a in the BMC device 208 to install firmware on the system board 204. With reference to FIG. 7B, in response to receiving the instruction to install firmware on the system board 204, the BMC engine 208a may perform firmware installation operations 702 that may include retrieving or receiving (e.g., via a network that is accessible to the BMC engine 208a, not illustrated) firmware for the system board 204, and configuring the system board 204 with that firmware by installing (e.g., "flashing") that firmware on one or more of the BIOS subsystems 206b in the BIOS 206, one or more of the BMC subsystems 208b in the BMC device 208, and/or the system board subsystems 210.

As such, one of skill in the art in possession of the present disclosure will appreciate how the firmware installation operations 702 may include installing BIOS firmware for the BIOS 206, BMC firmware for the BMC device 208, CPLD firmware for a CPLD, personality module firmware for a personality module, networking firmware for a networking card or other networking subsystem, storage firmware for a storage card or other storage subsystem, graphics firmware for a graphics card or other graphics subsystem, and/or the installation of any other firmware that would be apparent to one of skill in the art in possession of the present disclosure. Thus, following block 306b, the system board 204 may be configured to operate using the BIOS settings provided in the BIOS subsystems 206b, and the firmware installed on one or more of the BIOS subsystems 206b, one or more of the BMC subsystems 208b, and the system board subsystems 210.

As will be appreciated by one of skill in the art in possession of the present disclosure, in some examples the BIOS configuration operations at block 306a and the system board configuration operations at block 306b may be performed concurrently (or substantially at the same time) as required by the BIOS 206, the BMC device 208, the system board components 210, the BIOS settings, and/or the firmware. For example, following its receiving or retrieving of the BIOS settings and firmware as described above, the BMC engine 208a may generate a respective firmware installation job for installing the firmware on one or more of the BIOS subsystems 206b, one or more of the BMC subsystems 208b, and/or the system board subsystems 210, and may generate a BIOS configuration job for configuring the BIOS subsystems 206b with the BIOS settings, and then may perform the respective firmware installation job(s) and the BIOS configuration job in a sequence that provides for the installation of the firmware on one or more of the BIOS subsystems 206b, one or more of the BMC subsystems 208b, and/or the system board subsystems 210, and the configuration of the BIOS subsystems 206b with the BIOS settings, while taking interdependencies between those subsystems into account (e.g., which may include multiple reboot operations and/or the performance of other firmware installation/BIOS settings configuration techniques known in the art).

However, while concurrent performance of the BIOS configuration operations at block 306a and the system board configuration operations at block 306b has been described, the separate performance of the BIOS configuration operations at block 306a and the system board configuration operations at block 306b in a different manner (e.g., performance of the BIOS configuration operations after the system board configuration operations) is envisioned as falling within the scope of the present disclosure as well.

Figure 8A:
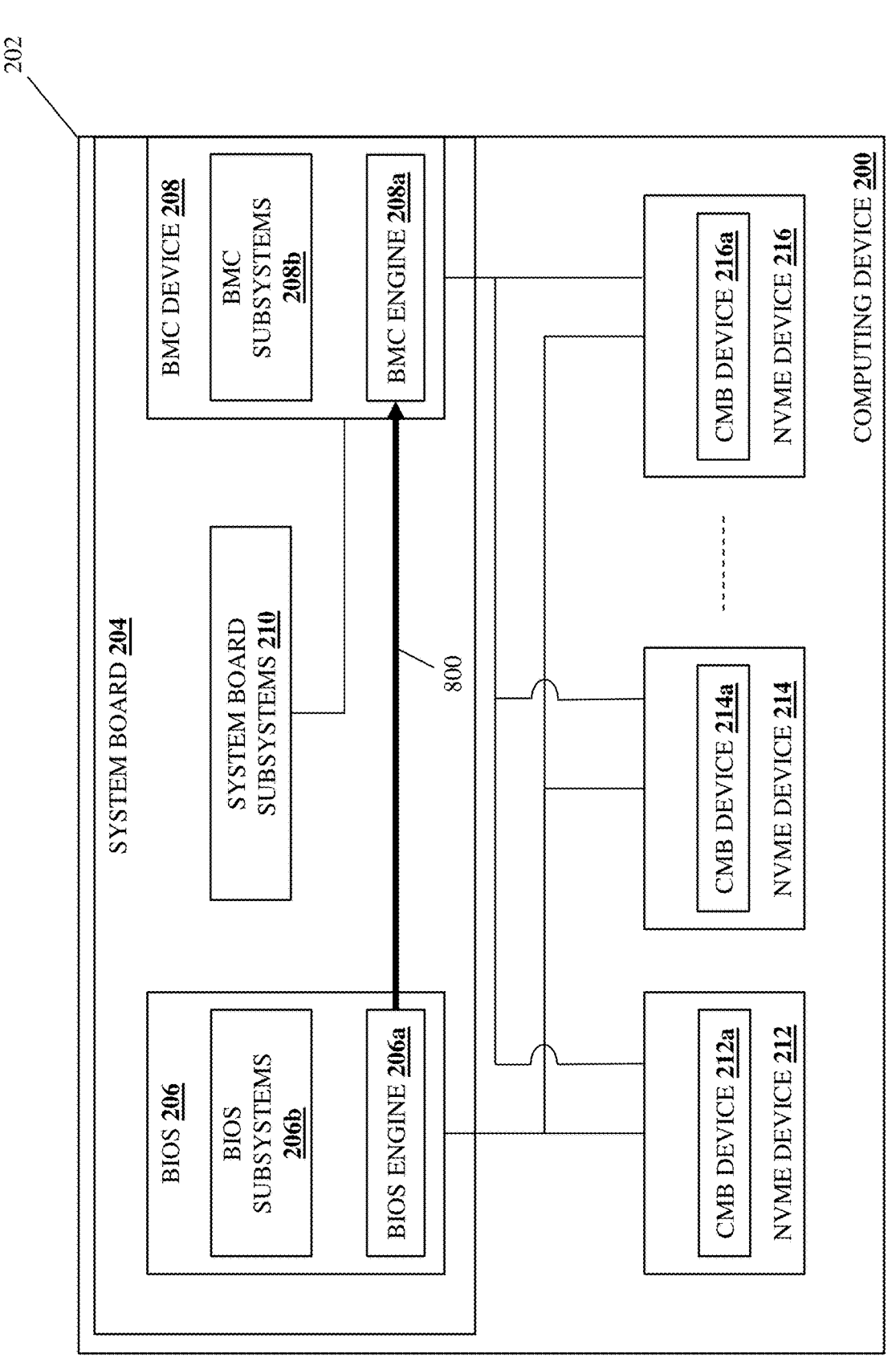
FIG. 8A is a schematic view illustrating an embodiment of the computing device of FIG. 2 operating during the method of FIG. 3.

The method 300 then proceeds to block 308 where the first BMC device backs up the computing device identification information, the BIOS settings, and the firmware in the CMB device. With reference to FIG. 8A, in an embodiment of block 308 and following the configuration of the BIOS subsystems 206b with BIOS settings and the installation of the firmware on the system board 204, the BIOS engine 206a may perform backup instruction provisioning operations 800 that include transmitting an instruction to the BMC engine 208a in the BMC device 208 to backup the BIOS settings, the firmware, and/or any other configuration information (e.g., a personality module configuration, UEFI diagnostics configuration information, etc.) for the system board 204 in the CMB device 216a of the NVMe device 216 that was identified to the BMC engine 208a at block 304. Furthermore, while the CMB device 216 is described as being identified to the BMC engine 208a at block 304 prior to the configuration of the BIOS 206 with the BIOS settings at block 306a and the configuration of the system board 204 with the firmware at block 306b, one of skill in the art in possession of the present disclosure will appreciate how the CMB device 216 may be identified to the BMC engine 208a at (or immediately prior to) block 308 (e.g., along with or as part of the backup instruction provisioning operations 800) similarly as described above with reference to block 304.

Figure 8B:
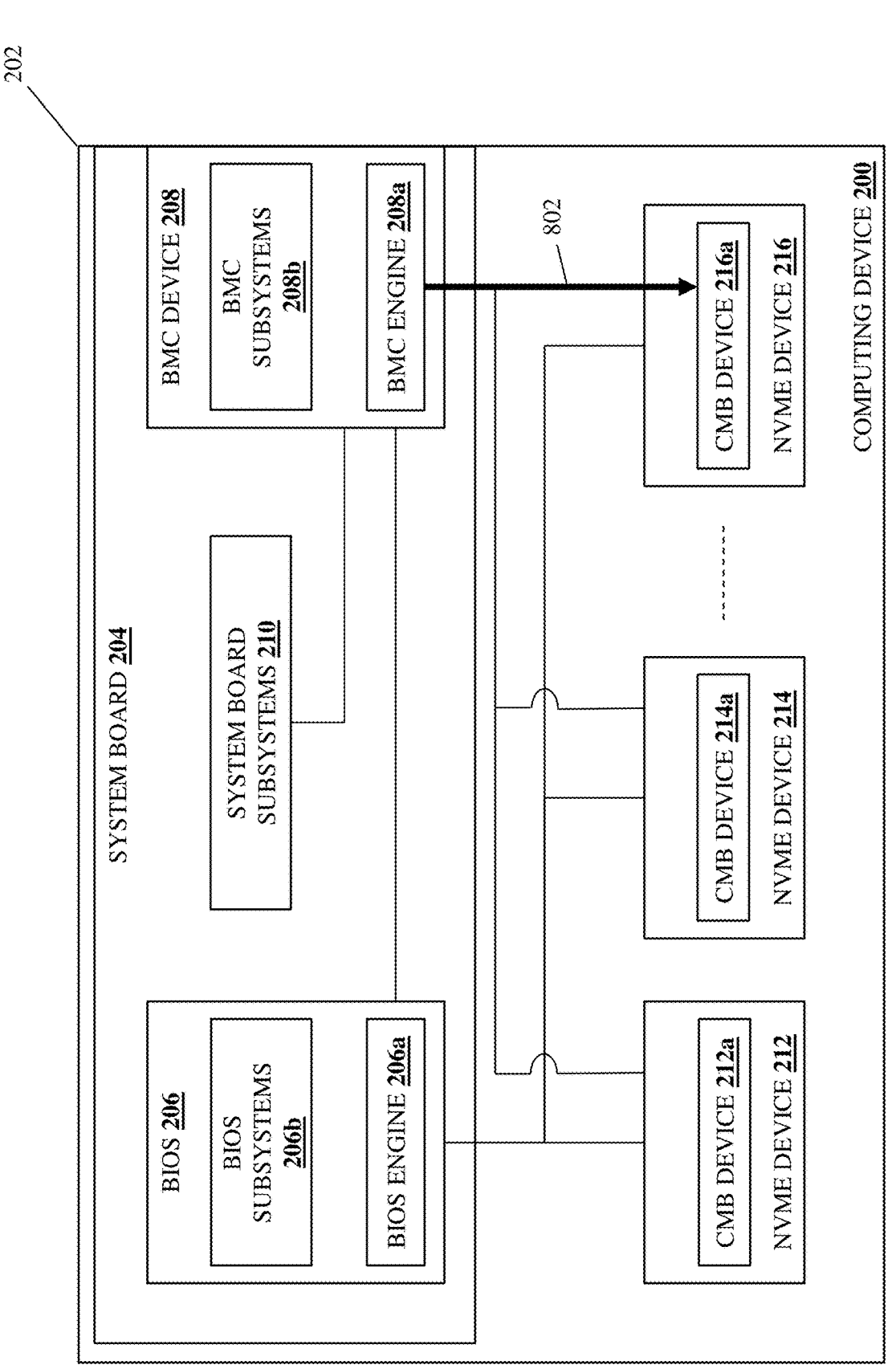
FIG. 8B is a schematic view illustrating an embodiment of the computing device of FIG. 2 operating during the method of FIG. 3.

With reference to FIG. 8B, in response to receiving the instruction to backup the BIOS settings, the firmware, and/or any other configuration information for the system board 204, the BMC engine 208a may perform backup operations 802 that may include storing (e.g., via a PCIe write using the NVMe-MI connection discussed above) the computing device identification information for the computing device 200, the BIOS settings used to configure the BIOS 206 at block 306a, and the firmware used to configure the system board 204, in the CMB device 216a of the NVMe device 216 that was identified to it by the BIOS 206 as discussed above with reference to block 304. As such, following block 308, the CMB device 216a may store the computing device identification information, the BIOS settings, BIOS firmware for the BIOS 206, BMC firmware for the BMC device 208, and system board subsystem firmware for the system board subsystems 210 (e.g., CPLD firmware, personality module firmware, networking firmware, storage firmware, graphics firmware, etc.).

The method 300 then proceeds to decision block 310 where the method 300 proceeds depending on whether updated firmware is detected. As will be appreciated by one of skill in the art in possession of the present disclosure, following the configuration of the BIOS 206 with the BIOS settings and the installation of the firmware on the system board 204 at blocks 306a and 306b as described above, the computing device 200 may complete initialization and enter a runtime state in which it uses the BIOS settings and firmware to operate in a desired manner. Furthermore, one of skill in the art in possession of the present disclosure will appreciate how the computing device 200 may be powered down and powered back on, rebooted, and/or otherwise power cycled, and will continue to use the BIOS settings and firmware provided at blocks 306a and 306b to initialize and operate in the runtime state until an update is provided for that firmware. As such, in an embodiment of decision block 310, the BMC engine 208a in the BMC device 208 may monitor for updated firmware for the system board 204.

If, at decision block 310, updated firmware is detected, the method 300 proceeds to block 312 where the first BMC device configures the first system board with updated firmware. In an embodiment, at decision block 310, the BMC engine 208a in the BMC device 208 may receive or retrieve a firmware update instruction (e.g., via a network that is accessible to the BMC engine 208a, not illustrated) to detect the updated firmware, and will retrieve or receive updated firmware and use it to configure the system board 204 at block 312 by installing (e.g., "flashing") that firmware on one or more of the BIOS subsystems 206*b* in the BIOS 206, one or more of the BMC subsystems 208*b* in the BMC device 208, and/or the system board subsystems 210 similarly as described above with reference to FIG. 7B. While not illustrated or described in detail, one of skill in the art in possession of the present disclosure will appreciate how the BMC engine 208*a* may install the updated firmware on the system board 204 using any of a variety of firmware update techniques known in the art, which may include rebooting the computing device 200 to retrieve/receive that firmware and install it on the system board 204, retrieving/receiving any updated BIOS settings that may be available as part of the reboot and configuring the BIOS subsystems 206*b* with those updated BIOS settings, and/or performing any other BMC update operations that would be apparent to one of skill in the art in possession of the present disclosure.

The method 300 then proceeds to block 314 where the first BMC device backs up the updated firmware in the CMB device. In an embodiment, at block 314, the BMC engine 208*a* in the BMC device 208 may back up the updated firmware that was installed on the system board 204 at block 312 as described above (as well as any updated BIOS settings) by storing that updated firmware (and any updated BIOS settings) in the CMB device 216*a* in the NVMe device 216 similarly as described above with reference to FIG. 8B. For example, the BMC device 208 may maintain a BMC inventory of firmware (and BIOS settings) used with the system board 204 that it may update when it updates firmware (and BIOS settings) on the system board 204 as described above. As such, at block 314 the BMC engine 208*a* may access the CMB device 216*a* in the NVMe device 216, determine when the firmware (and BIOS settings) that are backed up in the CMB device 216*a* do not match that BMC inventory and, in response, update the firmware (and BIOS settings) in the CMB device 216*a*. However, while a specific example has been described, one of skill in the art in possession of the present disclosure will appreciate how the firmware (and BIOS settings) that are backed up in the CMB device 216*a* may be updated using any of a variety of techniques that will fall within the scope of the present disclosure.

If at decision block 310 no updated firmware is detected, or following block 314, the method 300 proceeds to decision block 316 where the method 300 proceeds depending on whether the first system board is replaced with a second system board. As discussed below, the system board 204 may fail or otherwise become unavailable such that it must be replaced with a replacement system board, or may otherwise be upgraded with a new replacement system board, and/or may otherwise be subject to a variety of replacement scenarios that would be apparent to one of skill in the art in possession of the present disclosure. As such, at decision block 316, the method 300 will proceed depending on whether the system board 204 is replaced. If, at decision block 316, the first system board is not replaced with a second system board, the method 300 returns to decision block 310. As such, following the configuration of the BIOS 206 with the BIOS settings at block 306*a* and the installation of the firmware on the system board 204, the method 300 may loop such that the BMC engine 208*a* in the BMC device 208 installs updated firmware on the system board 204 when updated firmware become available (and/or configures the BIOS 206 with updated BIOS settings when updated BIOS settings become available), and backs up that updated firmware (and those updated BIOS settings) in the CMB device 216*a* in the NVMe device 216, until the system board 204 is replaced with a replacement system board.

Figure 9:
FIG. 9 is a schematic view illustrating an embodiment of the computing device of FIG. 2 with the system board replaced during the method of FIG. 3.

If, at decision block 316, the first system board is replaced with a second system board, the method 300 proceeds to block 318 where a second BIOS on the second system board in the computing device identifies the CMB device in the storage device in the computing device for system board restore operations during initialization. With reference to FIG. 9, the system board 204 may be replaced with a system board 900 that one of skill in the art in possession of the present disclosure will appreciate may be the same as, or similar to, the system board 204 discussed above. As such, the system board 900 may be provided by a motherboard, a system board provided by DC-SCMs defined by the Open Compute Project, and/or other system boards that would be apparent to one of skill in the art in possession of the present disclosure. In the examples discussed below, the system board 900 is described as being providing a "replacement" system board that replaces the system board 204 and that is "restored" using configuration information for the system board 204 that was backed up in the CMB device 216*a*, but one of skill in the art in possession of the present disclosure will appreciate how the system board 900 may be utilized in the system board backup and restore system of the present disclosure in a variety of manners that will fall within the scope of the present disclosure.

Similarly as described above, the system board 900 may include a BIOS 902 that one of skill in the art in possession of the present disclosure will appreciate may be configured to perform hardware initialization during boot operations (e.g., POST) and/or other initialization operations for the computing device 200, runtime services for operating systems and applications provided on the computing device 200, and/or other conventional BIOS operations known in the art. As can be seen in FIG. 9, the provisioning of the system board 900 in the computing device 200 couples the BIOS 902 to the NVMe devices 212, 214, and up to 216.

Similarly as described above, the BIOS 902 may include a BIOS processing system (not illustrated, but which may include the processor 102 discussed above with reference to FIG. 1 such as, for example, a Central Processing Unit (CPU)) and a BIOS memory system (not illustrated, but which may include the memory 114 discussed above with reference to FIG. 1 such as, for example, Dynamic Random Access Memory (DRAM)) that is coupled to the BIOS processing system and that includes instructions that, when executed by the BIOS processing system, cause the BIOS processing system to provide a BIOS engine 902*a* that is configured to perform the functionality of the BIOS engines, BIOS, and/or computing devices discussed below. Furthermore, the BIOS 902 may also include BIOS subsystems 902*b* that may be configured to store the computing device identification information, BIOS settings, and other configuration information described below, that may be configured with the firmware and/or other configuration information as described below, and/or that otherwise may be utilized in the system board backup and restore system of the present disclosure as described below.

Similarly as described above, the system board 900 may also include a BMC device 904 that one of skill in the art in possession of the present disclosure will recognize may provide an out-of-band management platform for the computing device 200 (using mostly separate resources from the computing device 200) via a browser-based interface or Command Line Interface (CLI) that enables management and monitoring of hardware in the computing device 200. In a specific example, the BMC device 904 may be provided by an integrated DELL® Remote Access Controller (iDRAC) available in computing devices available from DELL® Inc. of Round Rock, Texas, United States, or according to the OpenBMC project run by the LINUX® foundation, although other BMC devices will fall within the scope of the present disclosure as well. As can be seen in FIG. 9, the provisioning of the system board 900 in the computing device 200 couples the BMC device 904 to the NVMe devices 212, 214, and up to 216.

Similarly as described above, the BMC device 904 may include a BMC processing system (not illustrated, but which may be similar to the processor 102 discussed above with reference to FIG. 1) and a BMC memory system (not illustrated, but which may be similar to the memory 114 discussed above with reference to FIG. 1) that is coupled to the BMC processing system and that includes instructions that, when executed by the BMC processing system, cause the BMC processing system to provide a BMC engine 904*a* that is configured to perform the functionality of the BMC engines, BMC devices, and/or computing devices discussed below.

Furthermore, the BMC device 904 may also include BMC subsystems 904*b* that may be configured to store the BMC inventory information described below, that may be config- ured with the firmware and/or other configuration informa- tion as described below, and/or that otherwise may be utilized in the system board backup and restore system of the present disclosure as described below. Similarly as described above, the BMC device 904 may be coupled to the BIOS 902 via a communication subsystem that is described below as being provided by an IPMI communication sub- system in the specific examples provided below, but that may be provided by other communication subsystems (e.g., a PBI communication subsystem) while remaining within the scope of the present disclosure as well.

Similarly as described above, the system board 900 may also include a plurality of system board subsystems 906 that are coupled to the BMC device 904 and that may include a CPLD subsystem, a personality module, a networking sub- system (e.g., a NIC card or other networking card), a storage subsystem (e.g., a storage card), a graphics subsystem (e.g., a GPU card), and/or any other system board subsystem that would be apparent to one of skill in the art in possession of the present disclosure. As described below, any or all of the BIOS subsystems 902*b*, the BMC subsystems 904*b*, and the system board subsystems 906 may have firmware installed thereon according to the teachings of the present disclosure, but while specific subsystems are illustrated and described herein, one of skill in the art will appreciate how other subsystems may have firmware installed thereon while remaining within the scope of the present disclosure as well.

Figure 10:
FIG. 10 is a schematic view illustrating an embodiment of the computing device of FIG. 9 operating during the method of FIG. 3.

With reference to FIG. 10, in an embodiment of block 318, the computing device 200 may be powered on, booted, reset, rebooted, and/or otherwise be initialized such that the BIOS 902 begins hardware initialization (e.g., during POST) and/or other initialization operations known in the art. In an embodiment, during the initialization of the computing device 200 and as part of the initialization operations, the BIOS engine 902*a* in the BIOS 902 may determine that the system board 900 does not include computing device iden- tification information (e.g., the "service tag" for the com- puting device 200) and, in response, may determine whether a backup of BIOS settings and firmware exists. In a specific example, the BIOS engine 902*a* may check for the BIOS settings/firmware backup by performing CMB device iden- tification operations 1000 that include identifying the CMB device 216*a* in the NVMe device 216 for use in performing the system board restore operations described below.

As will be appreciated by one of skill in the art in possession of the present disclosure, while the identification of the CMB device 216*a* in the NVMe device 216 for use in performing system board restore operations is described herein, any of the CMB devices in any of the NVMe devices in the computing device 200 (e.g., the CMB device 212*a* in the NVMe device 212 and/or the CMB device 214*a* in the NVMe device 214) may be identified similarly as described herein for the CMB device 216*a* in the CMB device 216. Furthermore, while only a single CMB device is illustrated and described in detail as being identified during the method 300, as described below multiple CMB devices may be identified for use in providing additional storage capacity, redundancy, failover, and/or other benefits in the system board backup and restore operations as well.

In an embodiment, the CMB device identification opera- tions 1000 may include the BIOS engine 902*a* identifying the register for the CMB device 216*a* that was set at block 302 to indicate an intent to use the CMB device 216*a* for system board restore operations (e.g., the "CMBMSC.CRE" register for the CMB device 216*a* set to "1"). In some embodiments, as part of the CMB device identification operations 1000, the BIOS engine 902*a* may identify a location of the CMB device 216*a* (e.g., a CMB "offset" in a "CMBLOC" register in the controller of the NVMe device 216), a size of the CMB device 216*a* (e.g., a CMB storage capacity in a "CMBSZ" register in the controller of the NVMe device 216), and/or any other CMB properties that would be apparent to one of skill in the art in possession of the present disclosure. However, while a few specific examples of CMB device identification operations have been described, one of skill in the art in possession of the present disclosure will appreciate how the CMB device in a storage device may be identified for use in the system board restore operations described herein using a variety of tech- niques that will fall within the scope of the present disclo- sure as well.

Figure 11:
FIG. 11 is a schematic view illustrating an embodiment of the computing device of FIG. 9 operating during the method of FIG. 3.

The method 300 then proceeds to block 320 where the second BIOS transmits CMB device utilization information for the CMB device to a second BMC device on the second system board during initialization. With reference to FIG. 11, in an embodiment of block 320, the BIOS engine 902*a* in the BIOS 902 may perform CMB utilization information transmission operations 1100 that may include transmitting any of the CMB properties identified at block 320 to the BMC engine 904*a* in the BMC device 904 during the initialization of the computing device 200 and as part of those initialization operations. In a specific example, the CMB utilization information transmission operations 1100 may include the BIOS engine 902*a* transmitting the location of the CMB device 216*a* (e.g., the CMB "offset" of the CMB device 216*a*), the CMB storage capacity, and/or other CMB properties retrieved by the BIOS engine 206*a* as described above to the BMC engine 904*a* via the IPMI communication subsystem discussed above, although the transmission of other CMB utilization information and/or the use of other communication subsystems to transmit CMB utilization information will fall within the scope of the present disclo- sure as well.

Figure 12:
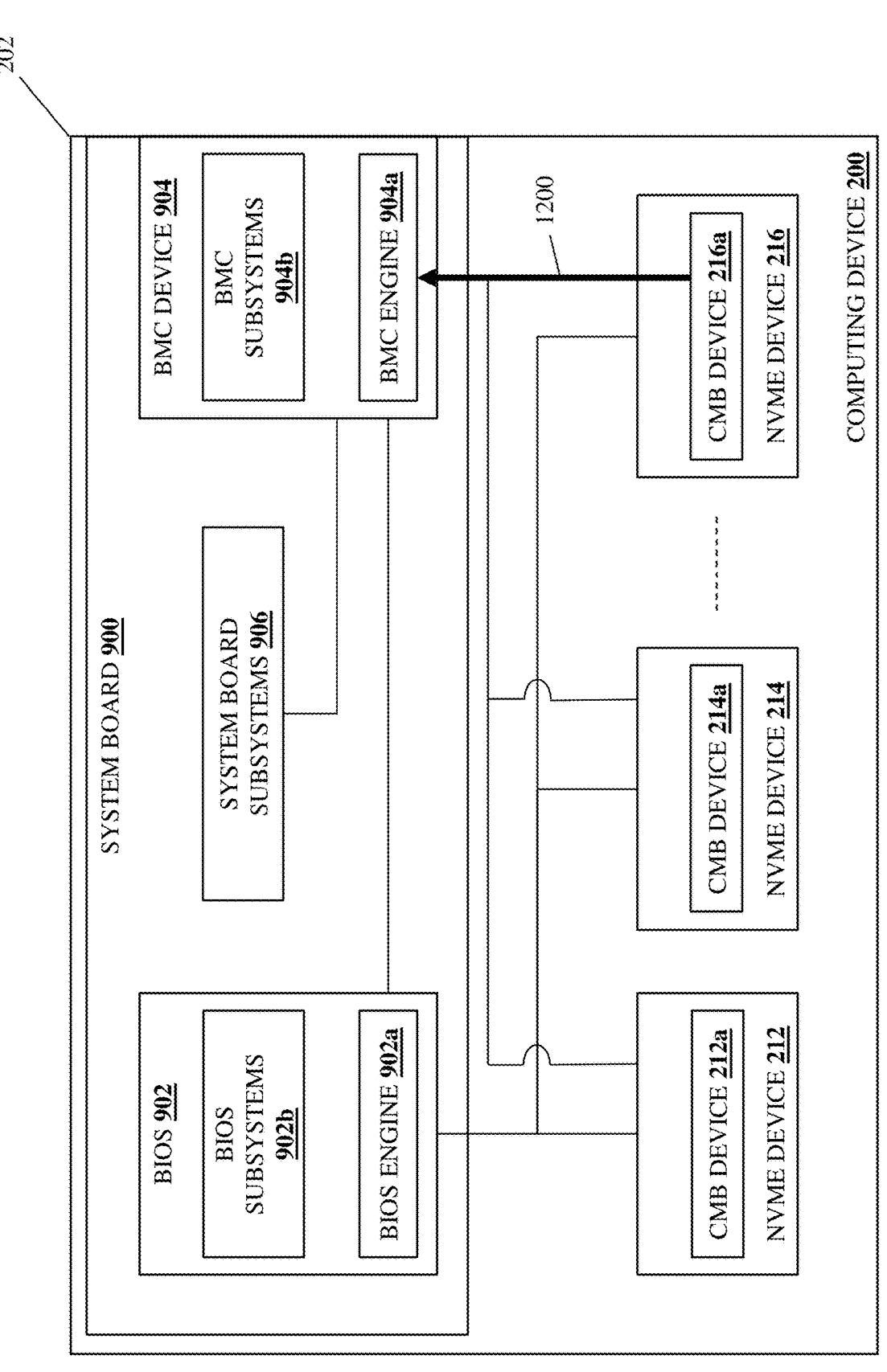
FIG. 12 is a schematic view illustrating an embodiment of the computing device of FIG. 9 operating during the method of FIG. 3.

The method 300 then proceeds to block 322 where the second BMC device retrieves the computing device identi- fication information, the BIOS settings, and the firmware from the CMB device. With reference to FIG. 12, in an embodiment of block 322, the BMC engine 904*a* in the BMC device 904 may perform configuration information retrieval operations 1200 that include accessing the CMB device 216*a* in the NVMe device 216 (e.g., using the CMB utilization information received from the BIOS engine 902*a* at block 320) and retrieving (e.g., via a PCIe read using the NVMe-MI connection discussed above) the computing device identification information, the BIOS settings, and the firmware that was backed up/stored in the CMB device 216*a* as described above during the use the system board 204 in the computing device 200.

In some embodiments, in response to retrieving the computing device identification information, the BIOS settings, and the firmware that was backed up/stored in the CMB device 216*a*, the BMC engine 904*a* may inform to the BIOS engine 902*a* that the backed up firmware (and BIOS settings) are available, and the BIOS engine 902*a* may provide a user with an option to restore the system board 900 using that backed up firmware (and BIOS settings). In response to receiving a selection by the user of the option to restore the system board 900 using the backed up firmware (and BIOS settings), the BIOS engine 902*a* may reboot the computing device 200 and, upon the powering on of the computing device and the beginning of initialization operations for the computing device 200, the BIOS engine 902*a* may instruct the BMC engine 904*a* to proceed with restoring the system board 900 using the backed up firmware (and BIOS settings).

Figure 13A:
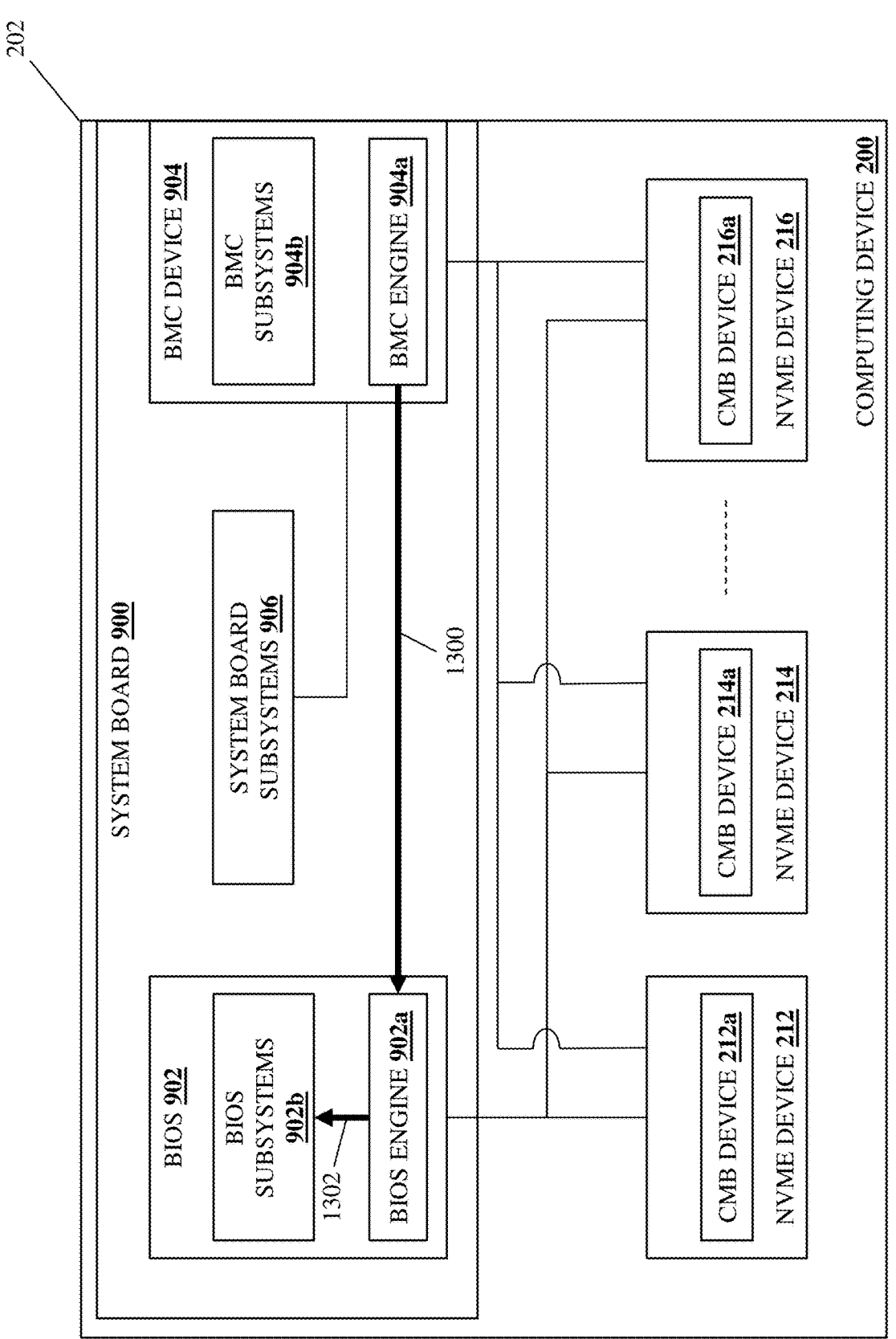
FIG. 13A is a schematic view illustrating an embodiment of the computing device of FIG. 9 operating during the method of FIG. 3.

The method 300 then proceeds to block 324*a* where the second BIOS is configured with the computing device identification information and the BIOS settings retrieved from the CMB device. With reference to FIG. 13A, in an embodiment of block 324*a*, the BMC engine 208*a* in the BMC device 208 may perform computing device identification information BIOS provisioning operations 1300 that include providing the BIOS 902 with the computing device identification information. For example, the computing device identification information BIOS provisioning operations 1300 may include transmitting the computing device identification information retrieved from the CMB device 216*a* to the BIOS engine 902, which may cause the BIOS engine 902*a* to perform BIOS configuration operations 1302 that include setting the computing device identification information as "CURRENT SYSTEM IDENTIFICATION" information in a memory subsystem included in the BIOS subsystems 902*b*, as well as performing any other BIOS setting configuration operations that would be apparent to one of skill in the art in possession of the present disclosure.

Figure 13B:
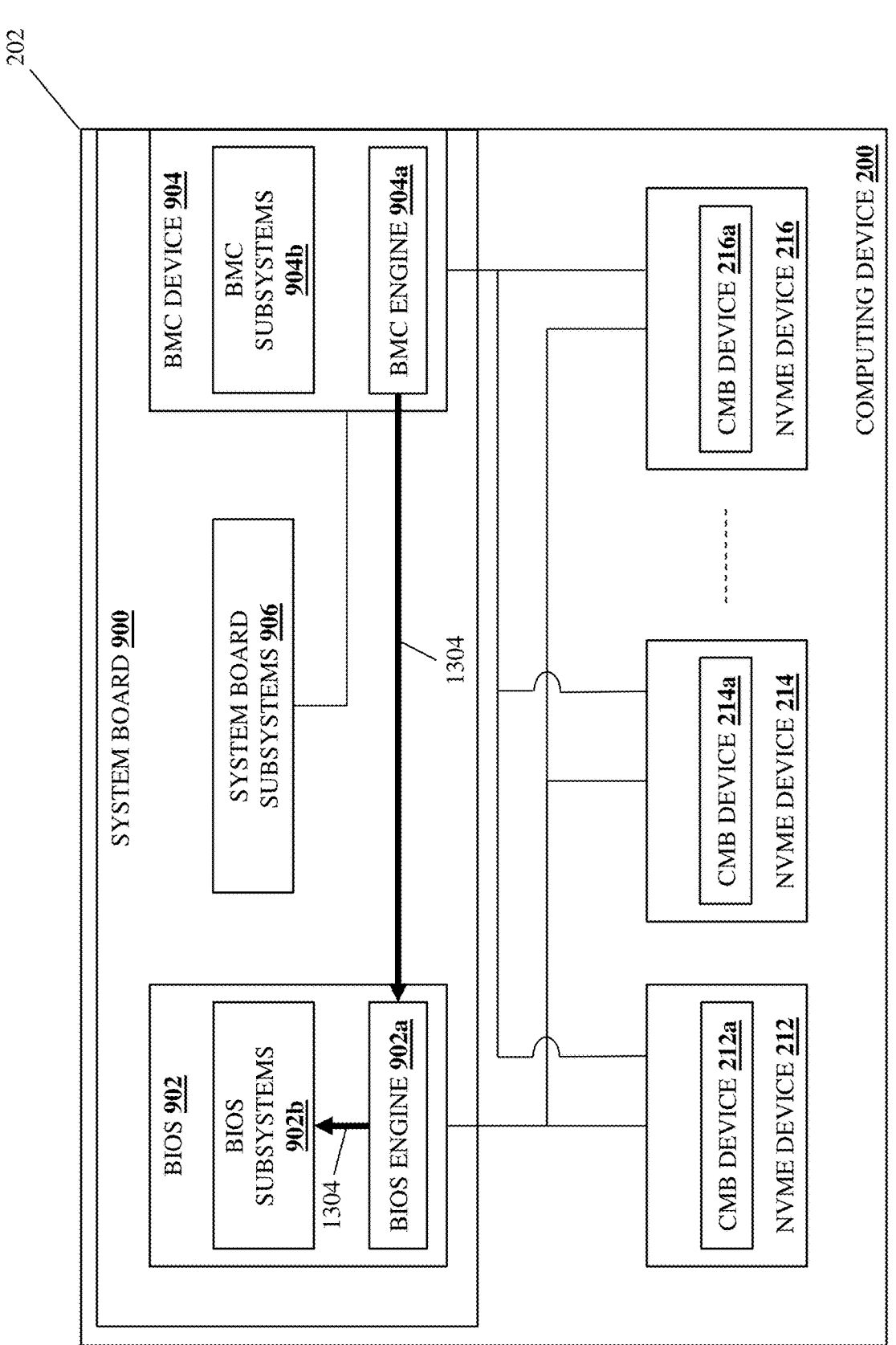
FIG. 13B is a schematic view illustrating an embodiment of the computing device of FIG. 9 operating during the method of FIG. 3.

With reference to FIG. 13B, in an embodiment of block 324*a*, the BMC engine 208*a* in the BMC device 208 may perform BIOS configuration operations 1304 that include configuring the BIOS 902 with the BIOS settings retrieved from the CMB device 216*a*. For example, the BIOS configuration operations 1304 may include the BMC engine 904 configuring one of more of the BIOS subsystems 902*b* using the BIOS settings by executing a configuration job to provide system performance information in the BIOS settings, boot information in the BIOS settings, power information in the BIOS settings, memory information in the BIOS settings, as well as performing any other BIOS setting configuration operations that would be apparent to one of skill in the art in possession of the present disclosure.

Figure 14A:
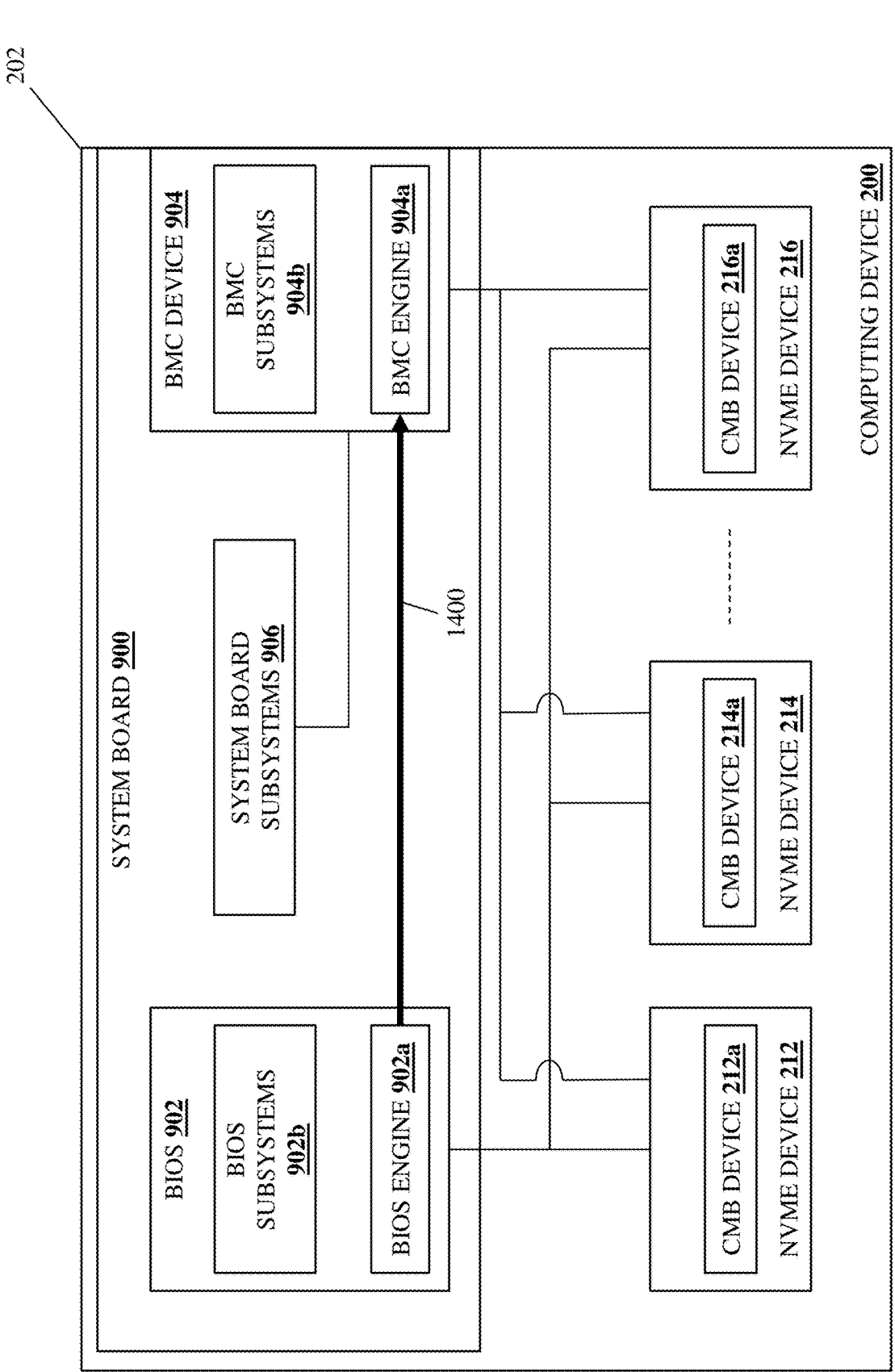
FIG. 14A is a schematic view illustrating an embodiment of the computing device of FIG. 9 operating during the method of FIG. 3.
Figure 14B:
FIG. 14B is a schematic view illustrating an embodiment of the computing device of FIG. 9 operating during the method of FIG. 3.

The method 300 then proceeds to block 324*b* where the second BMC device configures the second system board with the firmware retrieved from the CMB device. With reference to FIG. 14A, in an embodiment of block 324*b* and in response to receiving and storing the computing device identification information and configuring one or more of the BIOS subsystems 902*b* with the BIOS settings, the BIOS engine 902*a* may perform firmware installation instruction provisioning operations 1400 that include transmitting an instruction to the BMC engine 904*a* in the BMC device 904 to install the firmware retrieved from the CMB device 216*a* on the system board 900. With reference to FIG. 14B, in response to receiving the instruction to install the firmware retrieved from the CMB device 216*a* on the system board 900, the BMC engine 904*a* may perform firmware installation operations 1402 that may include configuring the system board 900 with the firmware that was retrieved from the CMB device 216*a* by installing (e.g., "flashing") that firmware on one or more of the BIOS subsystems 902*b* in the BIOS 902, one or more of the BMC subsystems 904*b* in the BMC device 904, and/or the system board subsystems 906.

As such, one of skill in the art in possession of the present disclosure will appreciate how the firmware installation operations 1402 may include installing BIOS firmware for the BIOS 902, BMC firmware for the BMC device 904, CPLD firmware for a CPLD, personality module firmware for a personality module, networking firmware for a networking card or other networking subsystem, storage firmware for a storage card or other storage subsystem, graphics firmware for a graphics card or other graphics subsystem, and/or installing any other firmware that would be apparent to one of skill in the art in possession of the present disclosure, with a success (or failure) of the firmware installation operations 1402 communicated to a user of the computing device 200 using any of a variety of techniques known in the art. Thus, following block 324*b*, the system board 900 may be configured to operate using the BIOS settings provided in one or more of the BIOS subsystems 902*b*, and the firmware installed on the BIOS subsystems 902*b*, the BMC subsystems 904*b*, and the system board subsystems 906, such that the system board 900 operates substantially similarly to the system board 204 immediately prior to its replacement (e.g., according to a "best known configuration" of the system board 204 that has been provided on the system board 900).

Similarly as described above, in some examples the BIOS configuration operations at block 324*a* and the system board configuration operations at block 324*b* may be performed concurrently (or substantially at the same time) as required by the BIOS 902, the BMC device 904, the system board components 906, the BIOS settings, and/or the firmware. For example, following its receiving or retrieving of the BIOS settings and firmware as described above, the BMC engine 904*a* may generate a respective firmware installation job for installing the firmware on one or more of the BIOS subsystems 902*b*, one or more of the BMC subsystems 904*b*, and/or the system board subsystems 906, and may generate a BIOS configuration job for configuring the BIOS subsystems 902*b* with the BIOS settings, and then may perform the respective firmware installation job(s) and the BIOS configuration job in a sequence that provides for the installation of the firmware on one or more of the BIOS subsystems 902*b*, one or more of the BMC subsystems 904*b*, and/or the system board subsystems 906, and the configuration of the BIOS subsystems 902*b* with the BIOS settings, while taking interdependencies between those subsystems into account (e.g., which may include multiple reboot operations and/or other firmware installation/BIOS settings configuration operations known in the art).

However, while concurrent performance of the BIOS configuration operations at block 324*a* and the system board configuration operations at block 324*b* has been described, the separate performance of the BIOS configuration operations at block 324*a* and the system board configuration operations at block 324*b* in a different manner (e.g., performance of the BIOS configuration operations after the system board configuration operations) is envisioned as falling within the scope of the present disclosure as well.

The method 300 the returns to decision block 310, with the "second" system board and "second" BMC device described above with reference to blocks 318, 320, 322, 324*a*, and 324*b* becoming the "first" system board and "first" BMC device of the method 300. As such, the method 300 may loop such that, following the configuration of the BIOS 902 with the BIOS settings at block 324*a* and the installation of the firmware on the system board 900, the BMC engine 904*a* in the BMC device 904 installs updated firmware on the system board 900 when updated firmware become available (and/or configures the BIOS 902 with updated BIOS settings when updated BIOS settings become available), and backs up that updated firmware (and those updated BIOS settings) in the CMB device 216*a* in the NVMe device 216, until the system board 900 is replaced with a replacement system board.

As discussed above, while only a single CMB device (i.e., the CMB device 216*a* in the NVMe device 216) is illustrated and described as being used in the system board backup and restore system of the present disclosure, other CMB devices (e.g., the CMB devices 212*a* and/or 214*a* in the NVMe devices 212 and/or 214, respectively) may be utilized to provide additional storage capacity, redundancy, and/or failover. For example, two or more of the CMB devices 212*a*-216*a* may be used to backup the BIOS settings and firmware similarly as described above if the size of the BIOS settings and firmware requires more storage capacity than any single CMB device provides. In another example, the CMB device 214*a* in the NVMe device 214 may be configured as a "failover CMB device" such that it is used for the system board backup and restore operations described above in the event the CMB device 216*a* in the NVMe device 216 becomes unavailable (e.g., if the NVMe device 216 is "hot-removed" from the computing device 200). In another example, the CMB device 214*a* in the NVMe device 214 may be configured as a "redundant CMB device" such that any of BIOS settings, firmware, and/or related information provided in the CMB device 216*a* as described above are mirrored in the CMB device 214*a* in the NVMe device 214, and may be utilized to continue system board backup and restore operations in the event the CMB device 216*a* becomes unavailable (e.g., if the NVMe device 216 is "hot-removed" from the computing device 200).

Furthermore, while the system board backup and restore system of the present disclosure allows conventional SPI-based flash storage devices to be removed from computing devices to reduce cost, in the event restoration of the system board 900 fails and such a conventional SPI-based flash storage device is present in the computing device, conventional partial restoration operations may be performed using BIOS settings stored in that SPI-based flash storage device similarly as described above.

Thus, systems and methods have been described that provide for the backing up of system board firmware and other system board configuration information for a first system board in a CMB device of a storage device coupled to the system board, and the restoring of a second system board (which replaces the first system board) to the configuration of the first system board using that system board firmware and other system board configuration information backed up in the CMB device. For example, the system board backup and restore system of the present disclosure may include a computing device, a storage device that is housed in the computing device and that includes a CMB device, and a replacement system board that is housed in the computing device, that is coupled to the storage device, and that includes a replacement system board BMC device. During initialization of the computing device, the replacement system board BMC device identifies the CMB device. Subsequent to identifying the CMB device, the replacement system board BMC device retrieves first firmware from the CMB device that was backed up in the CMB device by a replaced system board BMC device included on a replaced system board that was previously housed in the computing device and coupled to the storage device. The replacement system board BMC device then installs the first firmware on replacement system board subsystem(s) included on the replacement system board. As such, a replacement system board for a computing device may be restored to a best known configuration of a replaced system board that was used immediately prior to the replacement system board.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system board backup and restore system, comprising:
   a computing device;
   a storage device that is housed in the computing device and that includes a Controller Memory Buffer (CMB) device; and
   a replacement system board that is housed in the computing device, that is coupled to the storage device, and a replacement system board Baseboard Management Controller (BMC) device that is configured to:
      identify, during initialization of the computing device, the CMB device;
      retrieve, from the CMB device subsequent to identifying the CMB device, first firmware that was backed up in the CMB device by a replaced system board BMC device included on a replaced system board that was previously housed in the computing device and coupled to the storage device; and
      install the first firmware on at least one replacement system board subsystem that is included on the replacement system board.

2. The system of claim 1, wherein the replacement system board BMC device is configured to:
   retrieve second firmware that is updated relative to the first firmware;
   install the second firmware on the at least one replacement system board subsystem; and
   back up, subsequent to installing the second firmware on the at least one replacement system board subsystem, the second firmware in the CMB device.

3. The system of claim 1, wherein the replacement system board includes a replacement system board Basic Input/Output System (BIOS), and wherein the replacement system board BIOS is configured to:
   identify the CMB device to the replacement system board BMC device.

4. The system of claim 1, wherein the replacement system board BMC device is configured to:

retrieve, from the CMB device subsequent to identifying the CMB device, settings that were backed up in the CMB device by the replaced system board BMC device; and configure a replacement system board Basic Input/Output System (BIOS) that is included on the replacement system board with the settings.

5. The system of claim 4, wherein the replacement system board BMC device is configured to:

generate a respective firmware installation job for installing the first firmware on each of the at least one replacement system board subsystem;

generate a replacement system board BIOS configuration job for configuring the replacement system board BIOS with the settings; and perform the respective firmware installation job on each of the at least one replacement system board subsystem and the replacement system board BIOS configuration job on the replacement system board BIOS in a sequence that provides for the installation of the first firmware on each of the at least one replacement system board subsystem and the configuration of the replacement system board BIOS with the settings.

6. The system of claim 1, wherein the at least one replacement system board subsystem includes at least one of: a replacement system board BMC subsystem included in the replacement system board BMC device, a replacement system board Complex Programmable Logic Device (CPLD) subsystem included on the replacement system board, a replacement system board BIOS subsystem included in a replacement system board Basic Input/Output System (BIOS) included on the replacement system board, a replacement system board networking subsystem included on the replacement system board, a replacement storage subsystem included on the replacement system board, or a replacement graphics subsystem included on the replacement system board.

7. An Information Handling System (IHS), comprising:

a replacement system board;

a replacement system board Baseboard Management Controller (BMC) processing system that is included on the replacement system board; and a replacement system board BMC memory system that is included on the replacement system board, that is coupled to the replacement system board BMC processing system, and that includes instructions that, when executed by the replacement system board BMC processing system, cause the replacement system board BMC processing system to provide a replacement system board BMC engine that is configured to:

identify, during initialization of the IHS, a first CMB device in a first storage device that is coupled to the BMC processing system;

retrieve, from the first CMB device subsequent to identifying the first CMB device, first firmware that was backed up in the first CMB device by a replaced system board BMC device included on a replaced system board that was previously included in the IHS and coupled to the storage device; and install the first firmware on at least one replacement system board subsystem that is included on the replacement system board.

8. The IHS of claim 7, wherein the replacement system board BMC engine is configured to:

retrieve second firmware that is updated relative to the first firmware;

install the second firmware on the at least one replacement system board subsystem; and back up, subsequent to installing the second firmware on the at least one replacement system board subsystem, the second firmware in the first CMB device.

9. The IHS of claim 8, wherein the replacement system board BMC engine is configured to:

mirror the second firmware in a second CMB in the second storage device that is coupled to the BMC processing system.

10. The IHS of claim 7, wherein the replacement system board includes:

a replacement system board Basic Input/Output System (BIOS) processing system that is included on the replacement system board; and a replacement system board BIOS memory system that is coupled to the replacement system board BIOS processing system and that includes instructions that, when executed by the replacement system board BIOS processing system, cause the replacement system board BIOS processing system to provide a replacement system board BIOS engine that is configured to:

identify the first CMB device to the replacement system board BMC device.

11. The IHS of claim 7, wherein the replacement system board BMC engine is configured to:

retrieve, from the first CMB device subsequent to identifying the first CMB device, settings that were backed up in the first CMB device by the replaced system board BMC device; and configure a replacement system board Basic Input/Output System (BIOS) that is included on the replacement system board with the settings.

12. The IHS of claim 11, wherein the replacement system board BMC engine is configured to:

generate a respective firmware installation job for installing the first firmware on each of the at least one replacement system board subsystem;

generate a replacement system board BIOS configuration job for configuring the replacement system board BIOS engine with the settings; and perform the respective firmware installation job on each of the at least one replacement system board subsystem and the replacement system board BIOS configuration job on the replacement system board BIOS in a sequence that provides for the installation of the first firmware on each of the at least one replacement system board subsystem and the configuration of the replacement system board BIOS engine with the settings.

13. The IHS of claim 7, wherein the at least one replacement system board subsystem includes at least one of: a replacement system board BMC subsystem included on the replacement system board and coupled to the replacement system board BMC processing system, a replacement system board Complex Programmable Logic Device (CPLD) subsystem included on the replacement system board and coupled to the replacement system board BMC processing system, a replacement system board BIOS subsystem included on the replacement system board and coupled to the replacement system board BMC processing system, a replacement system board networking subsystem included on the replacement system board and coupled to the replacement system board BMC processing system, a replacement storage subsystem included on the replacement system board and coupled to the replacement system board BMC processing system, or a replacement graphics subsystem included on the replacement system board and coupled to the replacement system board BMC processing system.

14. A method for backing up and restoring a system board, comprising:

identifying, by a replacement system board Baseboard Management Controller (BMC) device on a replacement system board in a computing device during initialization of the computing device, a first CMB device in a first storage device that is included in the computing device;

retrieving, by the replacement system board BMC device from the first CMB device subsequent to identifying the first CMB device, first firmware that was backed up in the first CMB device by a replaced system board BMC device included on a replaced system board that was previously included in the computing device; and installing, by the replacement system board BMC device, the first firmware on at least one replacement system board subsystem that is included on the replacement system board.

15. The method of claim 14, further comprising:

retrieving, by the replacement system board BMC device, second firmware that is updated relative to the first firmware;

installing, by the replacement system board BMC device, the second firmware on the at least one replacement system board subsystem; and backing up, by the replacement system board BMC device subsequent to installing the second firmware on the at least one replacement system board subsystem, the second firmware in the first CMB device.

16. The method of claim 15, further comprising:

mirroring, by the replacement system board BMC device, the second firmware in a second CMB in a second storage device that is included in the computing device.

17. The method of claim 14, further comprising:

identifying, by a replacement system board Basic Input/Output System (BIOS) device on the replacement system board, the first CMB device to the replacement system board BMC device.

18. The method of claim 14, further comprising:

retrieving, by the replacement system board BMC device from the first CMB device subsequent to identifying the first CMB device, settings that were backed up in the first CMB device by the replaced system board BMC device; and configuring, by the replacement system board BMC device, a replacement system board Basic Input/Output System (BIOS) that is included on the replacement system board with the settings.

19. The method of claim 14, further comprising:

generating, by the replacement system board BMC device, a respective firmware installation job for installing the first firmware on each of the at least one replacement system board subsystem;

generating, by the replacement system board BMC device, a replacement system board BIOS configuration job for configuring the replacement system board BIOS engine with the settings; and performing, by the replacement system board BMC device, the respective firmware installation job on each of the at least one replacement system board subsystem and the replacement system board BIOS configuration job on the replacement system board BIOS in a sequence that provides for the installation of the first firmware on each of the at least one replacement system board subsystem and the configuration of the replacement system board BIOS engine with the settings.

20. The method of claim 14, wherein the at least one replacement system board subsystem includes at least one of: a replacement system board BMC subsystem included on the replacement system board, a replacement system board Complex Programmable Logic Device (CPLD) subsystem included on the replacement system board, a replacement system board BIOS subsystem included on the replacement system board, a replacement system board networking subsystem included on the replacement system board, a replacement storage subsystem included on the replacement system board, or a replacement graphics subsystem included on the replacement system board.

* * * * *